(12) United States Patent
Ogishita

(10) Patent No.: US 11,553,115 B1
(45) Date of Patent: Jan. 10, 2023

(54) MOVABLE CAMERA

(71) Applicant: Sony Interactive Entertainment LLC, San Mateo, CA (US)

(72) Inventor: Naoki Ogishita, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/349,810

(22) Filed: Jun. 16, 2021

(51) Int. Cl.
  *H04N 5/225* (2006.01)
  *G03B 17/56* (2021.01)
  *H04N 5/232* (2006.01)

(52) U.S. Cl.
  CPC ......... *H04N 5/2252* (2013.01); *G03B 17/561* (2013.01); *H04N 5/23206* (2013.01)

(58) Field of Classification Search
  CPC . H04N 5/2252; H04N 5/23206; G03B 17/561
  See application file for complete search history.

(56) References Cited

U.S. PATENT DOCUMENTS

| 4,532,544 | A | * | 7/1985 | Federau | H04N 3/02 |
| | | | | | 348/E3.006 |
| 2006/0072020 | A1 | * | 4/2006 | McCutchen | H04N 13/243 |
| | | | | | 348/E5.025 |
| 2009/0022421 | A1 | * | 1/2009 | Uyttendaele | G06T 3/4038 |
| | | | | | 382/284 |
| 2018/0017204 | A1 | | 1/2018 | Nokuo et al. | |
| 2018/0094765 | A1 | | 4/2018 | Riddiford et al. | |
| 2020/0311930 | A1 | * | 10/2020 | Cui | A61B 5/0042 |
| 2021/0227113 | A1 | * | 7/2021 | Helmrich | H04N 5/2252 |

FOREIGN PATENT DOCUMENTS

CN    210491080 U    5/2020

OTHER PUBLICATIONS

"International Search Report and Written Opinion", dated Sep. 9, 2022, from the counterpart PCT application PCT/US22/30496.

* cited by examiner

*Primary Examiner* — Timothy J Henn
(74) *Attorney, Agent, or Firm* — John L. Rogitz

(57) ABSTRACT

An imaging system includes a cylindrical housing defining left and right circular ends and formed with a linear slit extending from left end to right end. A camera is in the housing with a line of sight through the slit. A processor in the housing receives signals from the first camera and controls an actuator in the housing to rotate the cylindrical housing about a central axis defined the cylindrical housing such that the cylindrical housing can roll under influence of the actuator.

20 Claims, 12 Drawing Sheets

US 11,553,115 B1

MOVABLE CAMERA

FIELD

The application pertains to movable cameras.

BACKGROUND

Cameras are increasingly used not only for performing useful tasks, but also for providing a measure of aesthetic enjoyment.

SUMMARY

An imaging system includes a cylindrical housing defining left and right circular ends and formed with a linear slit extending from left end to right end. At least a first camera is in the housing with a line of sight through the slit. Also, at least one processor in the housing receiving signals from the first camera. At least one actuator in the housing is configured to be controlled by the processor to rotate the cylindrical housing about a central axis defined the cylindrical housing such that the cylindrical housing can roll under influence of the actuator.

In some examples the actuator can includes at least one electric motor and at least one semi-circular weight coupled to the motor and defining a curved outer surface juxtaposed with the inner surface of the cylindrical housing.

In some embodiments the first camera is mounted in a plastic insert disposed in the slit and filling the slit. At least one battery may be in the cylindrical housing and at least one wireless transceiver may be in the cylindrical housing and may be configured to communicate with the processor.

In some implementations the processor is programmed with instructions to actuate the actuator to roll the cylindrical housing until the slit is facing downward responsive to at least one signal, stopping the cylindrical housing with the slit facing downward. The signal can be an off signal.

Additional features may include at least one cradle with a top surface configured to receive the cylindrical housing thereon to charge at least one battery in the cylindrical housing. The cradle can include a rotatable activating arm below the top surface and magnetically couplable to at least one coupling associated with the cylindrical housing. The activating arm is rotatable to pivot the cylindrical housing on the top surface of the cradle.

Additional features may further include at least one attachment formed with a threaded receptacle to engage a threaded element of a camera support. The attachment can include an internal magnet to magnetically couple with at least one coupling associated with the cylindrical housing to engage the cylindrical housing camera support. The processor in the cylindrical housing can be programmed with instructions for causing the cylindrical housing to swivel relative to the camera support responsive to signals from the first camera in the cylindrical housing to, e.g., maintain a moving object in a field of view of the first camera.

The cylindrical housing can be a standalone housing with nothing attached to it.

In another aspect, an apparatus includes an elongated housing with a curved outer surface extending between first and second ends. A slit extends across the curved outer surface from the first end to the second end parallel to an axis defined by the housing. A filler is disposed in the slit to fill the slit, and at least one imager is in the filler with a field of view (FOV) extending through the slit beyond the elongated housing.

In another aspect, a method includes receiving at least one signal from at least a first camera mounted in a cylindrical housing and actuating an actuator in the housing to rotate the housing responsive to the signal.

The details of the present application, both as to its structure and operation, can best be understood in reference to the accompanying drawings, in which like reference numerals refer to like parts, and in which:

DETAILED DESCRIPTION

Figure 1:
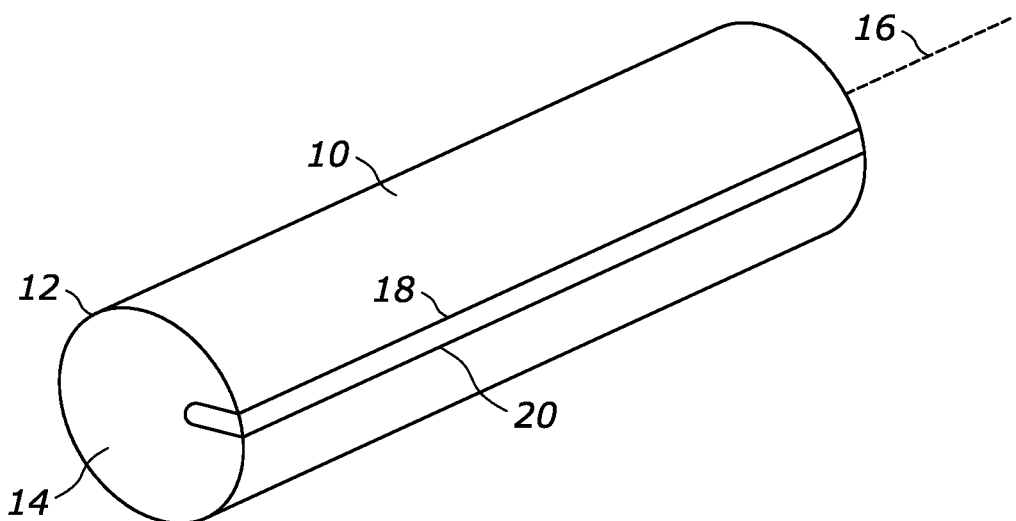
FIG. 1 is a perspective view of the imaging system including the cylindrical housing with a slit.
Figure 2:
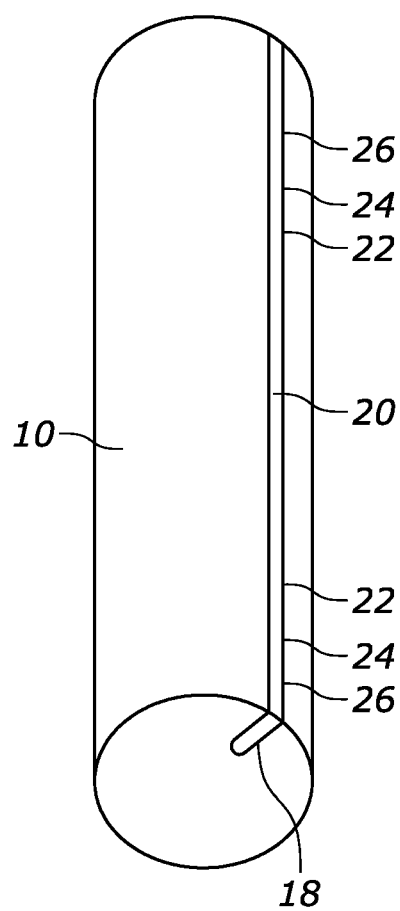
FIG. 2 is a perspective view of the imaging system illustrating sensors disposed in the slit.

FIGS. 1 and 2 illustrate an imaging system that includes a cylindrical hollow lightweight metal or plastic housing 10 defining left and right circular end peripheries 12 surrounding respective disk-shaped walls 14 that are perpendicular to the longitudinal axis 16 of the housing 10. Because it is cylindrical the housing 10 has a curved outer wall.

A linear slit 18 is formed in the wall of the housing 10 and extends from left end to right end 12 as shown, also extending through the disk-shaped walls 14 and parallel to the axis 16 of the housing. The slit 18 is formed through the housing 10 into the hollow interior of the housing.

A filler 20 such as a plate-shaped piece of plastic may be disposed in the slit, and one or more sensors may be supported in the filler 20 with the line of sight from the sensor(s) (all or at least part of the field of view (FOV) of the sensor(s) being established through the slit 18. In one example, three sensors are disposed in the slit 20 near each respective end 14. In a non-limiting example these sensors may include, inboard to outboard toward the respective wall 14, a red-green-blue (RGB) camera 22, and event detection sensor (EDS) 24, and a depth camera (6DoF) 26. An EDS uses the change of light intensity as sensed by one or more camera pixels as an indication of motion. An EDS provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

Figure 15:
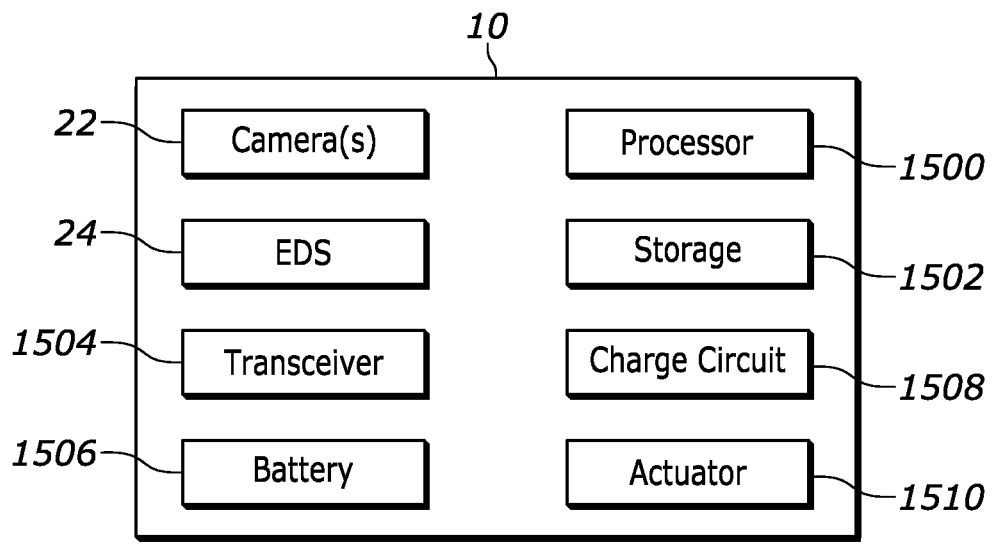
FIG. 15 is a block diagram showing internal components of the cylindrical housing.

Referring briefly to FIG. 15 showing components within the housing 10, at least one processor 1500 is in the housing 10 for receiving signals from the camera 22 and EDS 24. The processor may access at least one computer storage 1502 for data storage and to access instructions that configure the processor to execute certain logic described herein. One or more network interfaces 1504 such as wireless transceivers may be provided for control by the processor 1500 to send and receive signals. The components inside the housing 10 may be powered by one or more rechargeable batteries 1506 that may be recharged by a charge circuit 1508.

One or more actuators 1510 also may be provided in the housing for control by the processor 1500. The actuator 1510 may controlled by the processor 1500 to rotate the cylindrical housing 1500 about its central axis 16 such that the cylindrical housing 10 can roll under influence of the actuator 1510.

Figure 3:
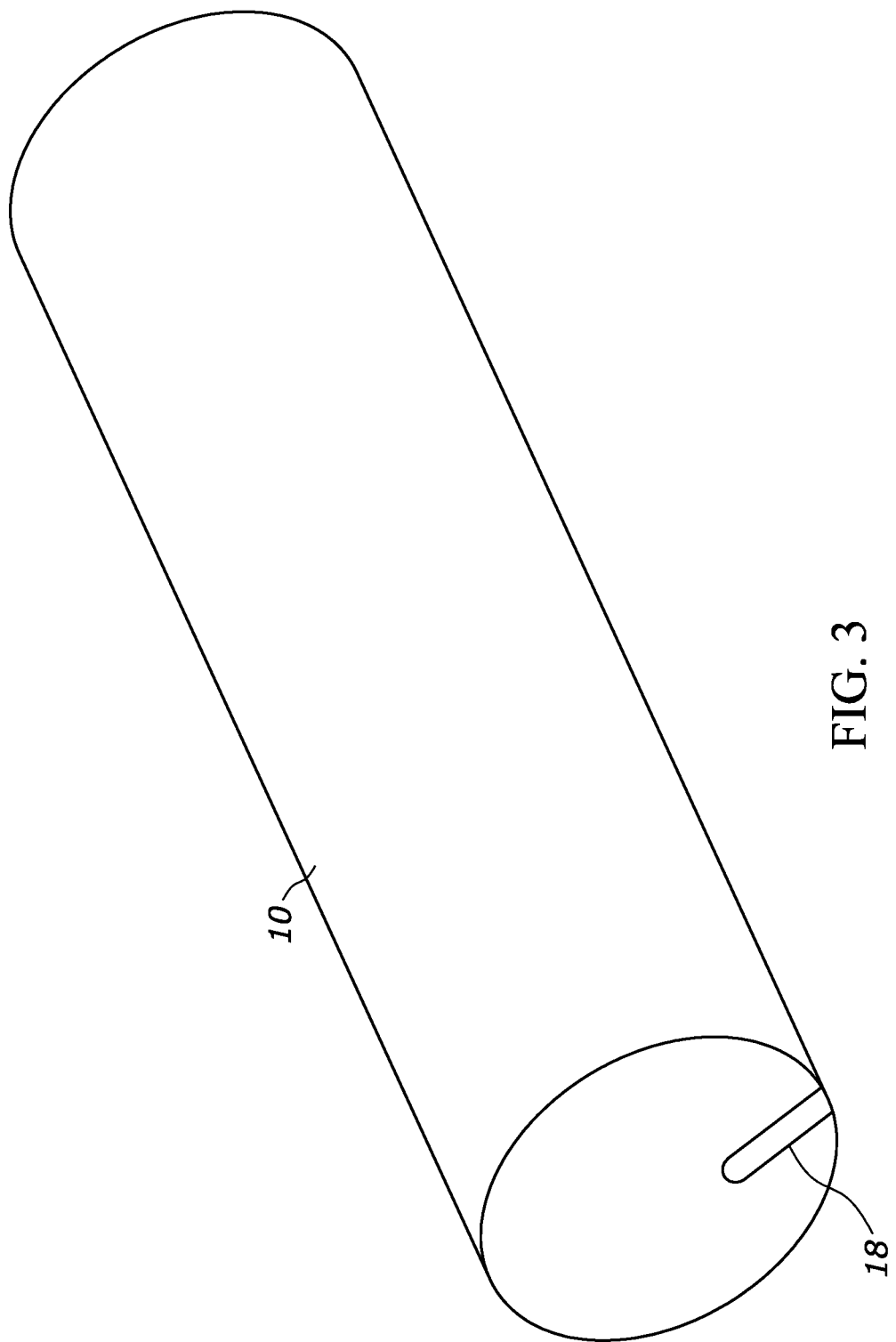
FIG. 3 is a perspective view of the imaging system showing that the housing has rolled until the slit faces downward, such as when the system is turned off.

FIG. 3 illustrates such a feature in which the processor is programmed with instructions to actuate the actuator 1510 to roll the cylindrical housing 10 until the slit 18 is facing downward responsive to at least one signal, stopping the cylindrical housing with the slit facing downward as shown. In some examples the signal may bean off signal received via the network interface 1504 from an external control device such as a wireless phone.

Figure 4:
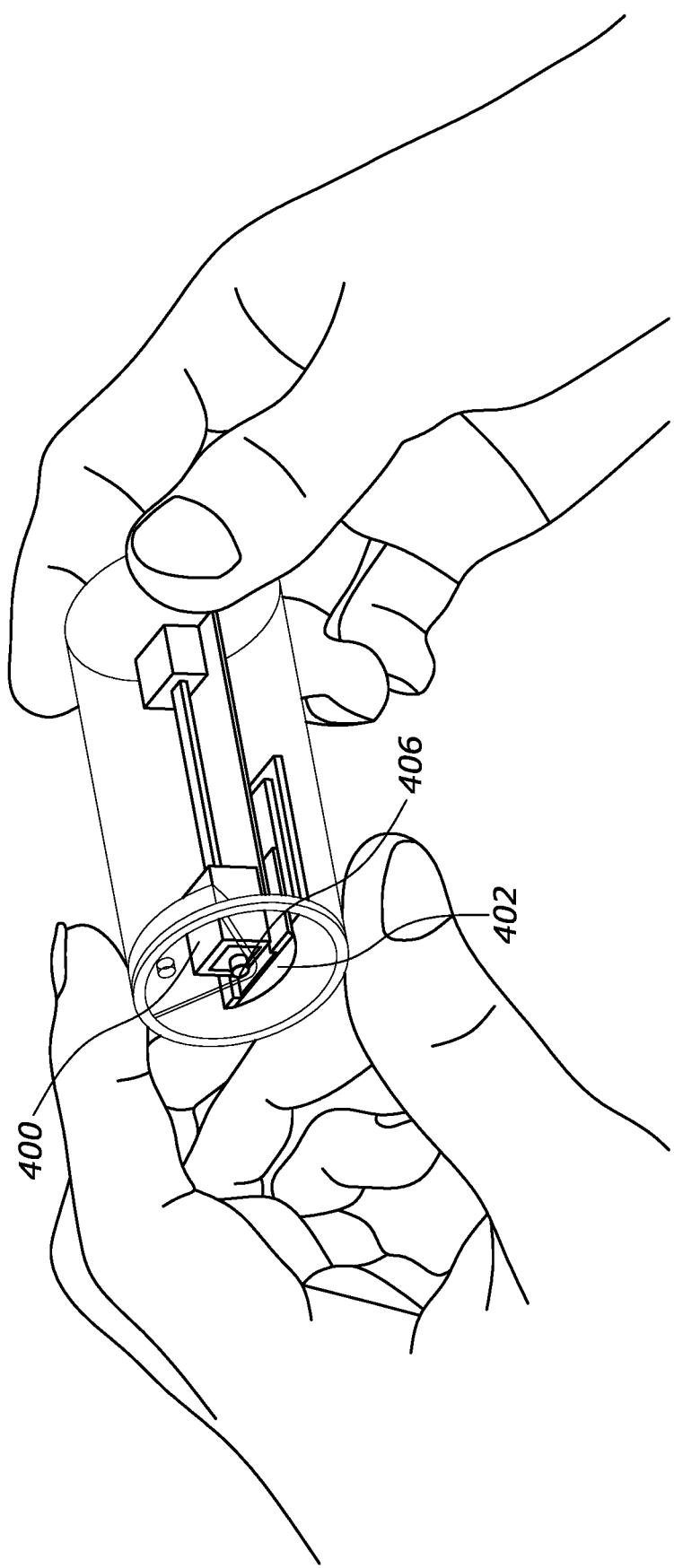
FIGS. 4 and 5 are views in the actuator inside the housing, with the housing shown in transparency.
Figure 5:
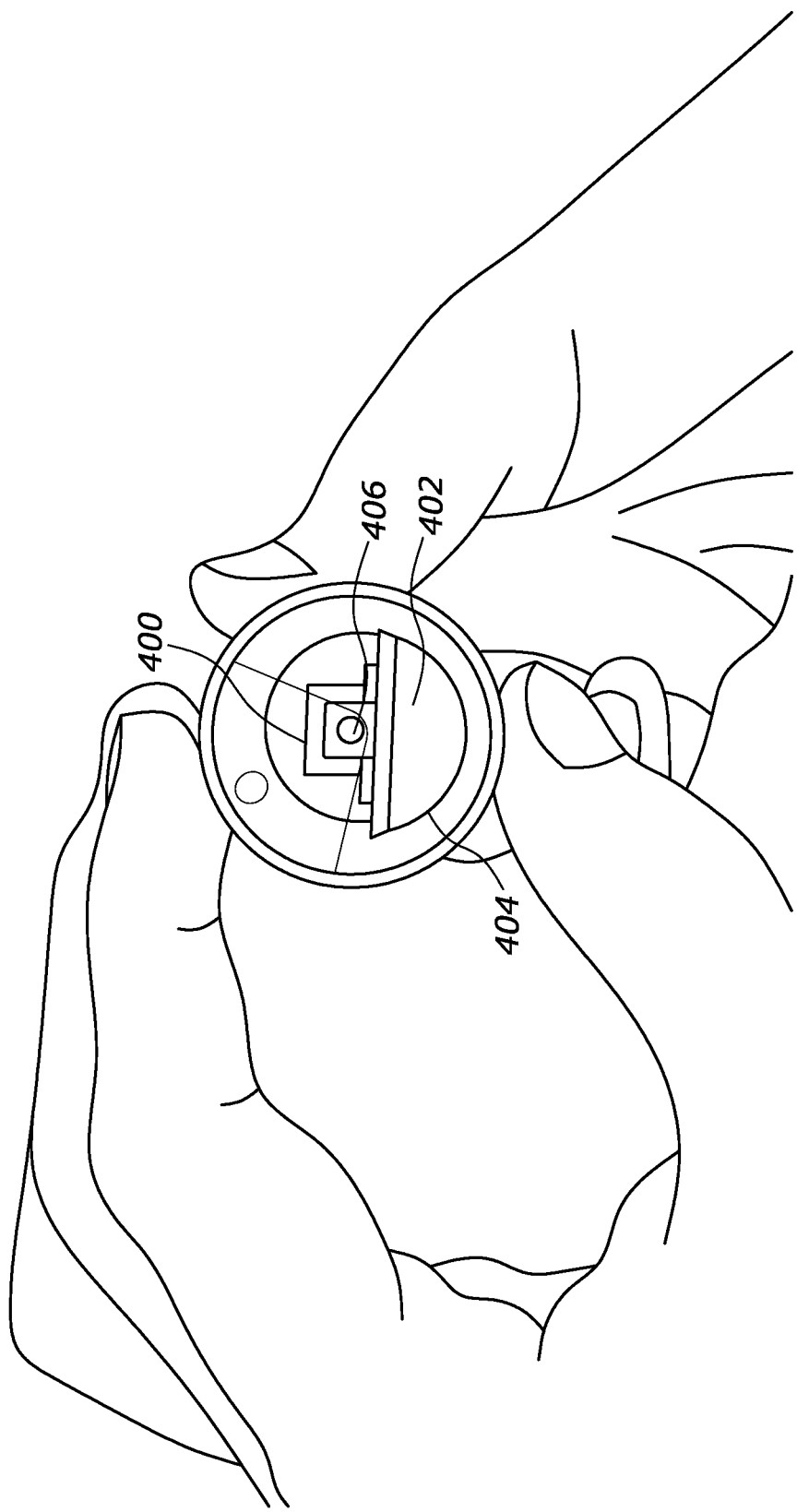

FIGS. 4 and 5 illustrate an embodiment of the actuator 1510 shown in FIG. 15 that includes at least one electric motor 400 and at least one semi-circular (in cross-section) weight 402 coupled to the motor 400 and defining a curved outer surface 404 juxtaposed with the inner surface of the cylindrical housing 10 (shown in transparency in FIGS. 4 and 5). The motor 400 turns a central axle 46 to which the weight 402 is rotatably coupled. The weight 402 is semi-cylindrical in three dimensions and may be magnetic or ferromagnetic. When the motor 400 is energized by the battery 1506 (FIG. 15), the influence of gravity on the weight 402 in combination with the rotation imparted by the motor 400 causes the housing 10 to roll.

FIGS. 6-10 illustrate further features of the imaging system. In one example embodiment, a plate-like parallelepiped-shaped cradle 600 is provided with a flat top surface 602 that may be made of suede and that can be configured to receive the cylindrical housing 10 thereon to charge the battery 1506 in the cylindrical housing 10. The cradle may include, e.g., a universal serial bus (USB) connector or other charge connector that can be connected to a source of power to recharge the battery through the charge circuit 1508 in the cylindrical housing 10.

Figure 8:
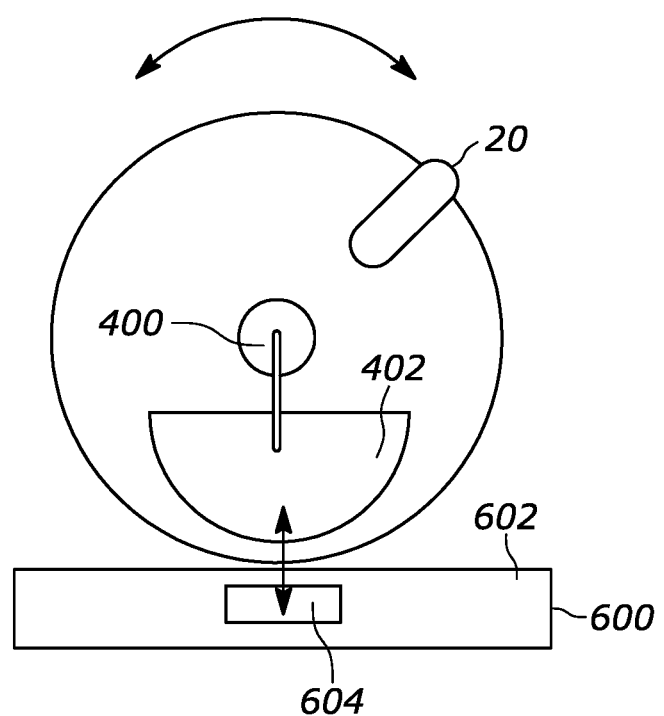
FIG. 8 is a schematic diagram of the housing on the charge cradle.

As best shown in FIG. 8, charge may be effected through a magnet 604 in the cradle 600 that magnetically and electrically couples with the weight 402 of the actuator 1501 in the cylindrical housing 10.

Figure 6:
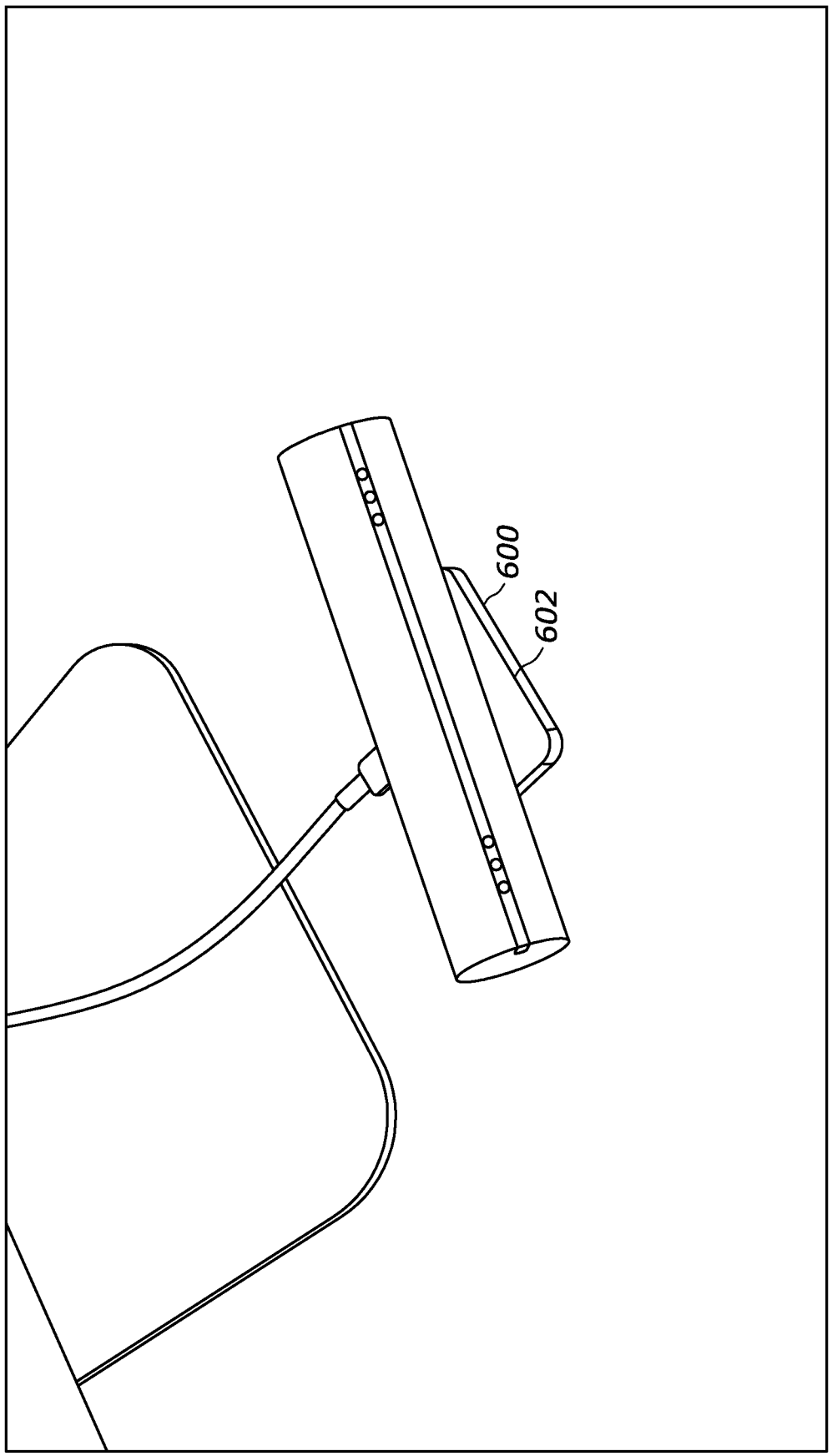
FIG. 6 is a perspective view of the imaging system with the housing disposed on a charge cradle.
Figure 7:
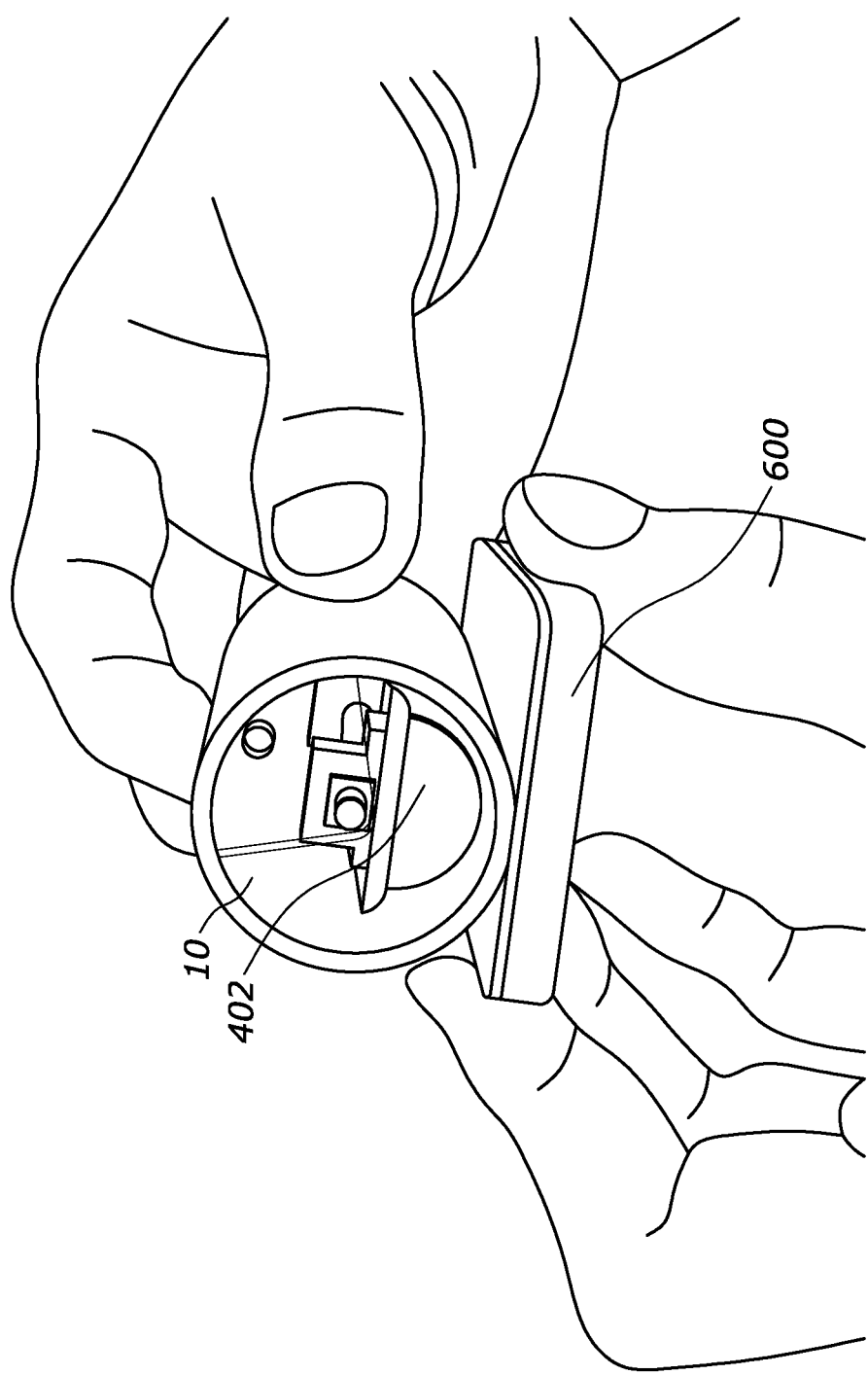
FIG. 7 is a view of the embodiment in FIG. 6 showing the housing in transparency.
Figure 10:
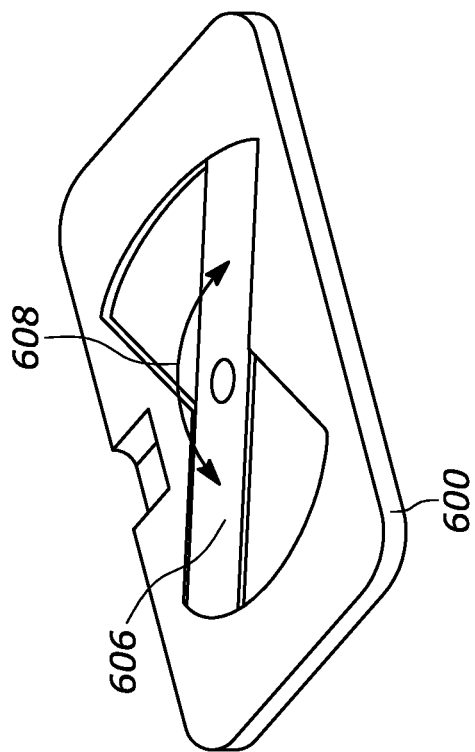
FIGS. 9 and 10 illustrate the charge cradle actuator with the top surface of the charge cradle removed.
Figure 9:
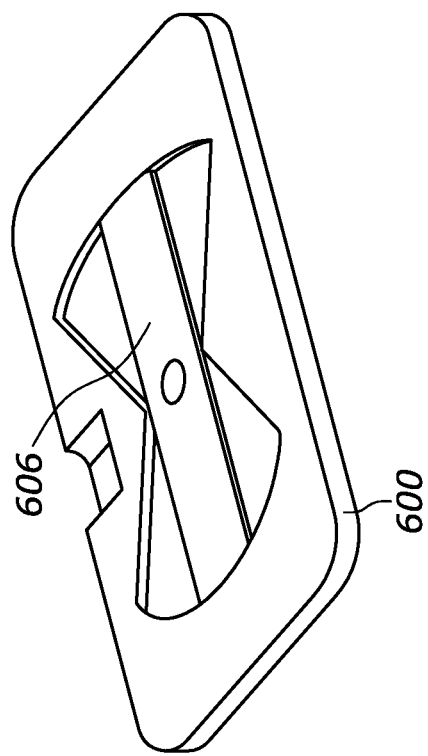
Figure 11:
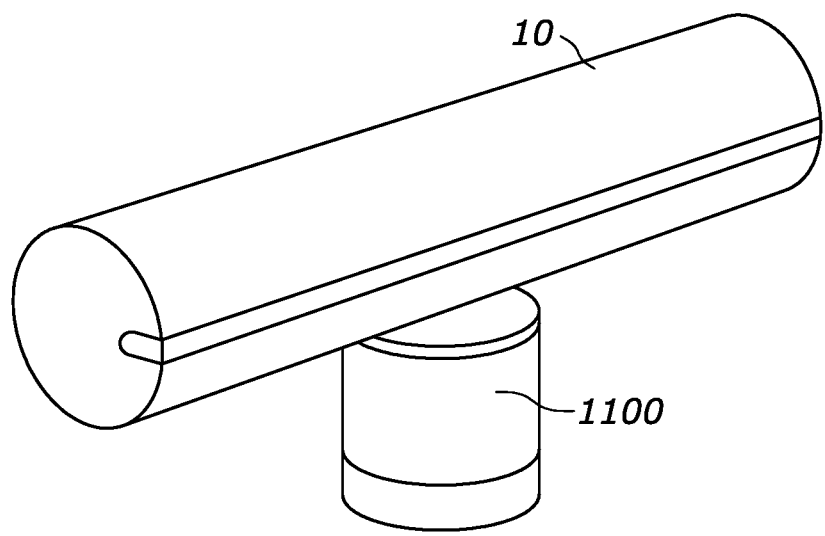
FIG. 11 is a perspective view of the housing on an adapter for a camera support such as a tripod.
Figure 12:
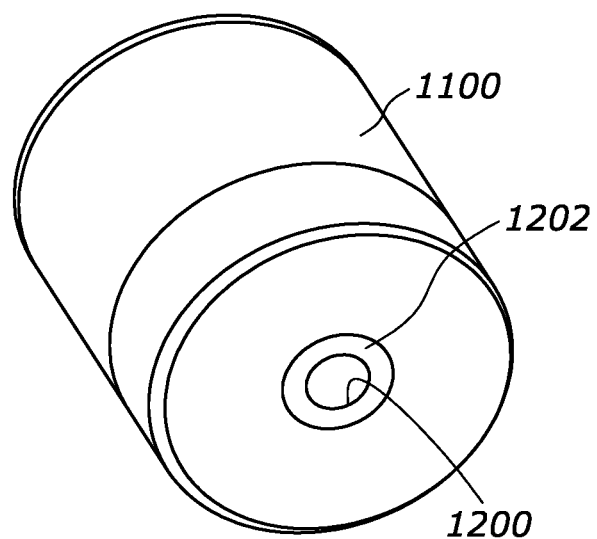
FIG. 12 is a perspective view of the adapter shown in FIG. 11.
Figure 13:
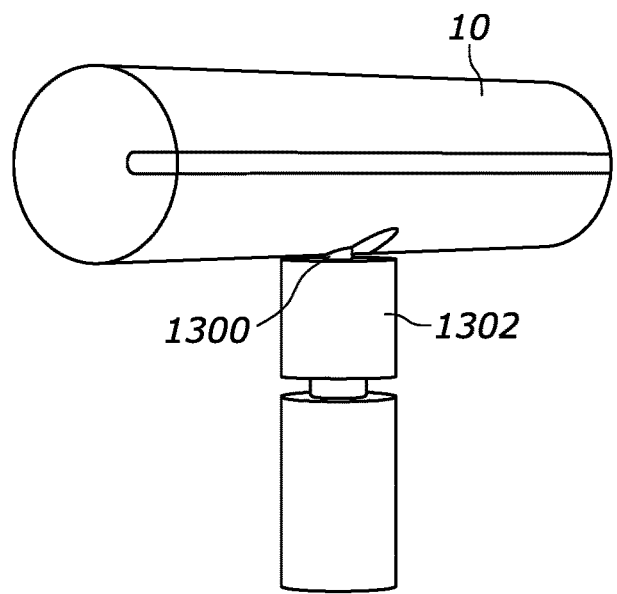
FIG. 13 is a perspective view of the housing on the adapter which is engaged with an upper portion of a tripod.
Figure 14:
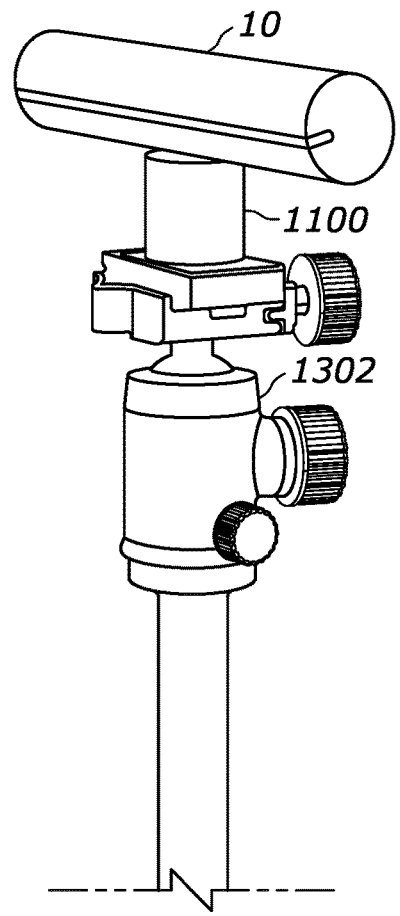
FIG. 14 is a perspective view of the housing on the adapter which is engaged with an upper portion of a tripod.

Furthermore, as shown in FIGS. 9 and 10, inside the cradle 600 a rotatable activating arm 606 that may be formed as an elongated bar or parallelepiped can pivot about its centerpoint. The arm 606 may magnetically couple with a magnet or ferromagnetic element in the housing 10 (such as the weight 402) to pivot the cylindrical housing 10 on the top surface of the cradle as shown by the arrows 608 from, e.g., an orientation in which the housing 10 is parallel to edges of the cradle 10 (FIG. 7) to one in which the housing 10 forms an oblique angle with the edges of the cradle (FIG. 6).

FIGS. 11-14 illustrate further features of the imaging system. An attachment 1100 that may be cylindrical is formed with a threaded receptacle 1200 (FIG. 12) to engage a threaded element 1300 (FIG. 13) of a camera support 1302 such as a camera tripod. The attachment 1100, which can have a suede top surface, may include an internal magnet 1202 (FIG. 12, in the non-limiting example shown, formed as a cylinder) to magnetically and electrically couple with at least one coupling associated with the cylindrical housing 10 (such as the weight 402) to engage the cylindrical housing camera support without the need for fasteners. A processor can be in the attachment 1100.

Figure 16:
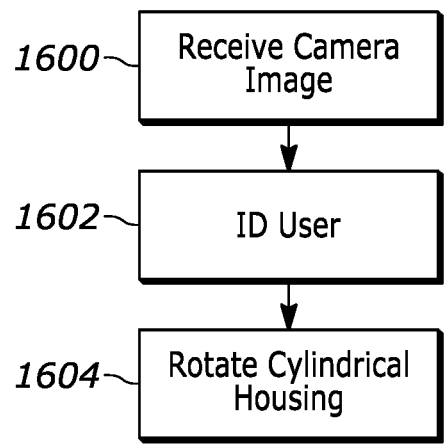
FIGS. 16 and 17 illustrate example logic in example flow chart format consistent with present principles.

FIG. 16 illustrates that at block 1600, the processor 1500 in the housing 10 or other processor receives an image from, e.g., one of the imaging devices in the housing 10. At block 1602, using image recognition, a person such as a known user may be recognized in the image, so that at block 1604 the processor 1500 in the housing 10 or other processor can actuate the attachment 1100 to rotate to cause the cylindrical housing to 10 swivel relative to the camera support responsive to signals from the imaging device in the cylindrical housing. The processor may swivel the housing 10 to maintain a moving object such as a person in a field of view of the imaging device.

Figure 17:
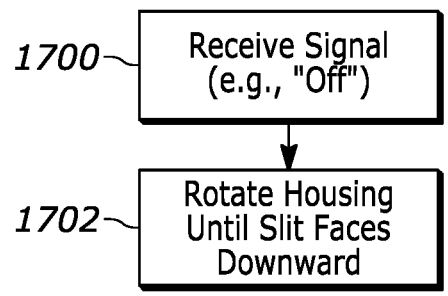

FIG. 17 illustrate logic alluded to above with respect to FIGS. 1-3. At block 1700, the processor 1500 in the cylindrical housing 10 receives signals from, e.g., any of the imaging devices discussed herein or from a signal from a control device such as a cell phone to turn the imaging system off. At block 1702 the processor actuates the actuator 1510 to rotate the housing until the slit 18 faces downward as shown in FIG. 3.

Figure 18:
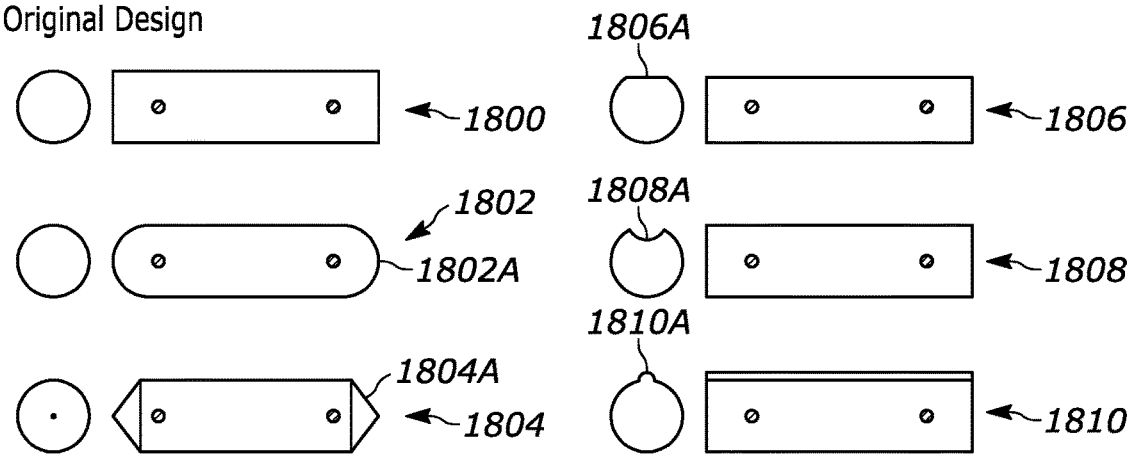
FIG. 18 illustrates a longitudinal elevational and transverse elevational view for the system shown in FIG. 1 plus longitudinal elevational and transverse elevational views of five additional embodiments of differing body shapes.

FIG. 18 illustrates at 1800 a transverse elevational and longitudinal elevational view of the system shown in FIG. 1.

FIG. 18 illustrates at 1802 a transverse elevational and longitudinal elevational view of an alternate camera that in all essential respects is identical to the system in FIG. 1 except that opposite ends of the body 1802A are convex.

FIG. 18 illustrates at 1804 a transverse elevational and longitudinal elevational view of an alternate camera that in all essential respects is identical to the system in FIG. 1 except that opposite ends of the body 1804A are conical.

FIG. 18 illustrates at 1806 a transverse elevational and longitudinal elevational view of an alternate camera that in all essential respects is identical to the system in FIG. 1 except that the body has a flat upper surface 1806A extending along the length of the camera.

FIG. 18 illustrates at 1808 a transverse elevational and longitudinal elevational view of an alternate camera that in all essential respects is identical to the system in FIG. 1 except that the body has a concave upper surface 1808A extending along the length of the camera.

FIG. 18 illustrates at 1810 a transverse elevational and longitudinal elevational view of an alternate camera that in all essential respects is identical to the system in FIG. 1 except that the body has a raised rib 1810A extending along the length of the camera.

Figure 19:
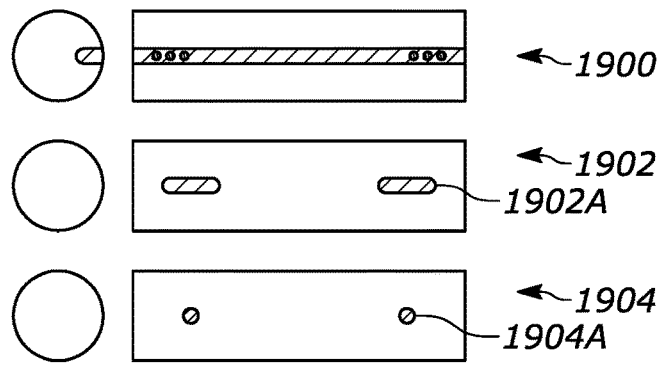
FIG. 19 illustrates a longitudinal elevational and transverse elevational view for the system shown in FIG. 1 plus longitudinal elevational and transverse elevational views of two additional embodiments of differing slit shapes.

FIG. 19 illustrates at 1900 a transverse elevational and longitudinal elevational view of the system shown in FIG. 1.

FIG. 19 illustrates at 1902 a transverse elevational and longitudinal elevational view of an alternate camera that in all essential respects is identical to the system in FIG. 1 except that instead of a single elongated slit, two smaller spaced-apart elongated slits 1902A are formed on the body.

FIG. 19 illustrates at 1904 a transverse elevational and longitudinal elevational view of an alternate camera that in all essential respects is identical to the system in FIG. 1 except that instead of a single elongated slit, two smaller spaced-apart circular slits 1904A are formed on the body.

Figure 20:
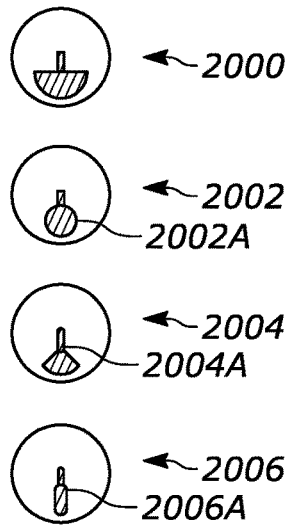
FIG. 20 shows a transverse elevational view for the system shown in FIG. 1 plus transverse elevational views of three additional embodiments using different weight shapes.

FIG. 20 illustrates at 2000 a transverse elevational view of the system shown in FIG. 1 in transparency to show the weight.

FIG. 20 illustrates at 2002 a transverse elevational view in partial transparency of an alternate camera that in all essential respects is identical to the system in FIG. 1 except that a weight 2002A has a circular periphery.

FIG. 20 illustrates at 2004 a transverse elevational view in partial transparency of an alternate camera that in all essential respects is identical to the system in FIG. 1 except that a weight 2004A has a conical periphery.

FIG. 20 illustrates at 2006 a transverse elevational view in partial transparency of an alternate camera that in all essential respects is identical to the system in FIG. 1 except that a weight 2006A has an elongated cylindrical periphery with a flat end or a convex end juxtaposed with the inside surface of the body.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

A processor may be a single- or multi-chip processor that can execute logic by means of various lines such as address lines, data lines, and control lines and registers and shift registers.

Network interfaces such as transceivers may be configured for communication over at least one network such as the Internet, a WAN, a LAN, etc. An interface may be, without limitation, a Wi-Fi transceiver, Bluetooth transceiver, near filed communication transceiver, wireless telephony transceiver, etc.

Computer storage may be embodied by computer memories such as disk-based or solid-state storage that are not transitory signals.

Present principles may employ machine learning models, including deep learning models. Machine learning models use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that that are configured and weighted to make inferences about an appropriate output.

While the particular camera is herein shown and described in detail, it is to be understood that the subject matter which is encompassed by the present invention is limited only by the claims.

What is claimed is:

1. An imaging system, comprising:
a cylindrical housing defining left and right circular ends and formed with a linear slit extending from left end to right end;
at least a first camera in the housing with a line of sight through the slit;
at least one processor in the housing receiving signals from the first camera; and
at least one actuator in the housing configured to be controlled by the processor to rotate the cylindrical housing about a central axis defined the cylindrical housing such that the cylindrical housing can roll under influence of the actuator.

2. The imaging system of claim 1, wherein the actuator comprises:
at least one electric motor;
at least one semi-circular weight coupled to the motor and defining a curved outer surface juxtaposed with the inner surface of the cylindrical housing.

3. The imaging system of claim 1, wherein the first camera is mounted in a plastic insert disposed in the slit and filling the slit.

4. The imaging system of claim 1, comprising at least one battery in the cylindrical housing and at least one wireless transceiver in the cylindrical housing configured to communicate with the processor.

5. The imaging system of claim 1, wherein the processor is programmed with instructions to actuate the actuator to roll the cylindrical housing until the slit is facing downward responsive to at least one signal, stopping the cylindrical housing with the slit facing downward.

6. The imaging system of claim 5, wherein the at least one signal comprises an off signal.

7. The imaging system of claim 1, comprising at least one cradle with a top surface configured to receive the cylindrical housing thereon to charge at least one battery in the cylindrical housing, the cradle comprising a rotatable activating arm below the top surface and magnetically couplable to at least one coupling associated with the cylindrical housing, the activating arm being rotatable to pivot the cylindrical housing on the top surface of the cradle.

8. The imaging system of claim 1, comprising at least one attachment formed with a threaded receptacle to engage a threaded element of a camera support, the attachment comprising an internal magnet to magnetically couple with at least one coupling associated with the cylindrical housing to engage the cylindrical housing camera support, the processor in the cylindrical housing being programmed with instructions for causing the cylindrical housing to swivel relative to the camera support responsive to signals from the first camera in the cylindrical housing.

9. The imaging system of claim 8, wherein the processor is programmed with instructions to cause the cylindrical housing to swivel to maintain a moving object in a field of view of the first camera.

10. The imaging system of claim 7, wherein the processor is programmed with instructions to cause the cylindrical housing to swivel to maintain a moving object in a field of view of the first camera.

11. The imaging system of claim 1, wherein the cylindrical housing is a standalone housing with nothing attached to it.

12. An apparatus, comprising:
an elongated housing comprising a curved outer surface extending between first and second ends, a slit being in the housing;
at least one imager having a field of view (FOV) extending through the slit beyond the elongated housing; and
at least one cradle with a top surface configured to receive the housing thereon to charge at least one battery in the housing, the cradle comprising a rotatable activating arm below the top surface and magnetically couplable to at least one coupling associated with the housing, the activating arm being rotatable to pivot the housing on the top surface of the cradle.

13. The apparatus of claim 12, comprising:
at least one processor in the housing receiving signals from the imager; and
at least one actuator in the housing configured to be controlled by the processor to rotate the housing about the axis such that the housing can roll under influence of the actuator.

14. The apparatus of claim 13, wherein the actuator comprises:
at least one electric motor;
at least one weight coupled to the motor and defining an outer surface juxtaposed with an inner surface of the housing.

15. The apparatus of claim 12, comprising at least one wireless transceiver in the housing configured to communicate with at least one processor.

16. The apparatus of claim 15, wherein the processor is programmed with instructions to actuate an actuator to roll the housing until the slit is facing downward responsive to at least one signal, stopping the housing with the slit facing downward.

17. The apparatus of claim 12, comprising a filler disposed in the slit to fill the slit.

18. The apparatus of claim 12, comprising at least one attachment formed with a threaded receptacle to engage a threaded element of a camera support, the attachment comprising an internal magnet to magnetically couple with at least one coupling associated with the housing to engage the housing camera support, at least one processor in the housing being programmed with instructions for causing the housing to swivel relative to the camera support responsive to signals from the imager in the housing.

19. The apparatus of claim 18, wherein the processor is programmed with instructions to cause the housing to swivel to maintain a moving object in a field of view of the imager.

20. The apparatus of claim 12, wherein the housing is a standalone housing with nothing attached to it.

* * * * *